United States Patent
Kim et al.

(10) Patent No.: US 8,974,966 B2
(45) Date of Patent: Mar. 10, 2015

(54) NEGATIVE ELECTRODE FOR LITHIUM RECHARGEABLE BATTERY AND LITHIUM RECHARGEABLE BATTERY ADOPTING THE SAME

(75) Inventors: Bongchull Kim, Yongin-si (KR); Jangho Lee, Yongin-si (KR); Dongwoo Kim, Yongin-si (KR); Hayoung Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1068 days.

(21) Appl. No.: 12/256,304

(22) Filed: Oct. 22, 2008

(65) Prior Publication Data

US 2009/0104519 A1    Apr. 23, 2009

(30) Foreign Application Priority Data

Oct. 23, 2007   (KR) .................. 10-2007-0106596

(51) Int. Cl.
*H01M 4/38*   (2006.01)
*H01M 4/48*   (2010.01)
(Continued)

(52) U.S. Cl.
CPC ............. *H01M 4/587* (2013.01); *H01M 4/364* (2013.01); *H01M 4/38* (2013.01); *H01M 4/485* (2013.01); *H01M 10/0525* (2013.01); *Y02E 60/122* (2013.01)
USPC ...................... 429/231.8; 429/209; 429/218.1

(58) Field of Classification Search
CPC ................................ H01M 4/02; H01M 4/133
See application file for complete search history.

(56) References Cited

U.S. PATENT DOCUMENTS 6,627,352 B1 *  9/2003  Okochi et al. ............. 429/231.8
2002/0164479 A1 * 11/2002 Matsubara et al. ........... 428/367
(Continued)

FOREIGN PATENT DOCUMENTS

CN   1374712   10/2002
CN   1894811   1/2007
(Continued)

OTHER PUBLICATIONS

Japanese Office Action dated Aug. 16, 2011 for corresponding Japanese Application No. 2008-265744, 3 pages.

*Primary Examiner* — Barbara Gilliam
*Assistant Examiner* — Adam A Arciero
(74) *Attorney, Agent, or Firm* — Knobbe Martens Olson & Bear LLP

(57) ABSTRACT

A negative electrode for a lithium rechargeable battery comprising: active material layers including metal-carbon combination active material particles including at least one active material selected from metal or metal oxide and carbonaceous active material, soft graphite particles, and a binder for binding the metal-carbon combination active material particles and the soft graphite particles; and a current collector on which surface the active material layers are stacked, wherein the soft graphite particles have a pellet density of 1.6~1.9 g/cc when a pellet is formed at a press pressure of 1 ton/cm2, and the lithium rechargeable battery adopting the negative electrode.

Soft graphite is used as a shock absorbing material when the bulk of the metal-carbon combination active material particles expands by the charging of the battery, which inhibits the expansion of bulk in the active material layer as a whole, maintains and attains a conductive contact point between the active material particles including the soft graphite particles, thereby preventing degradation of capacity due to a repetition of the charging and discharging of the battery and increasing the lifetime cycle of the battery.

11 Claims, 1 Drawing Sheet

(51) Int. Cl.
*H01M 2/02* (2006.01)
*H01M 4/587* (2010.01)
*H01M 4/36* (2006.01)
*H01M 4/485* (2010.01)
*H01M 10/0525* (2010.01)

(56) References Cited

U.S. PATENT DOCUMENTS

| | | | |
|---|---|---|---|
| 2003/0049532 A1 | 3/2003 | Kurokawa et al. | |
| 2003/0091901 A1 | 5/2003 | Kaneda et al. | |
| 2005/0019660 A1* | 1/2005 | Koga et al. | 429/231.8 |
| 2005/0136330 A1 | 6/2005 | Mao et al. | |
| 2006/0127773 A1* | 6/2006 | Kawakami et al. | 429/245 |
| 2006/0159995 A1 | 7/2006 | Ishikawa et al. | |

FOREIGN PATENT DOCUMENTS

| | | |
|---|---|---|
| EP | 1 054 462 A1 | 11/2000 |
| JP | 2004-273443 | 9/2004 |
| JP | 2003-331832 A | 8/2011 |
| JP | 2004-146292 A | 8/2011 |
| JP | 2004-299944 A | 8/2011 |
| JP | 2004-349164 A | 8/2011 |
| JP | 2004-352789 A | 8/2011 |
| KR | 1019999003082 | 5/1999 |
| KR | 1020040005605 | 1/2004 |
| KR | 1020060001719 | 1/2006 |
| KR | 20070102881 | 10/2007 |
| KR | 1020070113066 | 11/2007 |

* cited by examiner

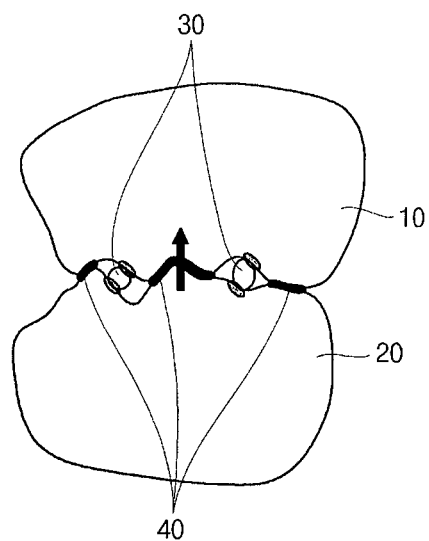

NEGATIVE ELECTRODE FOR LITHIUM RECHARGEABLE BATTERY AND LITHIUM RECHARGEABLE BATTERY ADOPTING THE SAME

CROSS-REFERENCE TO RELATED APPLICATION

This application claims priority to and the benefit of Korean Patent Application No. 10-2007-0106596, filed on Oct. 23, 2007, the entire content of which is incorporated herein by reference.

BACKGROUND OF THE INVENTION

1. Field of the Invention

The present invention relates to a negative electrode for a lithium rechargeable battery and the lithium rechargeable battery adopting the same, and more particularly to, a negative electrode for a lithium rechargeable battery that uses a complex material of metal or non-metal and oxide thereof and a carbonaceous material as a negative electrode active material, and the lithium rechargeable battery adopting the negative electrode.

2. Description of the Related Art

Portable electronic devices such as personal digital assistants (PDAs), mobile phones, notebook computers, digital cameras, and the like, portable electronic devices have become very popular and are increasingly smaller in size and lighter in weight. This has resulted in a strong demand for a battery suitable for a power source of portable electronic devices. In particular, among rechargeable batteries that can be charged and discharged, a lithium rechargeable battery, having a lower discharge rate and a higher energy density than conventional lead battery, nickel cadmium battery, etc., is widely used for high electronic devices.

Although a lithium metal having a high energy density has been suggested as a negative active material of the lithium rechargeable battery, the lithium metal has a problem with its safety since a dendrite in a negative electrode can form when the lithium rechargeable battery is charged. The dendrite can extend through a separator between electrodes and potentially cause an internal short circuit.

Further, the dendrite can have a very large surface area with a high reactivity, and can form a high-polymer capture site having a low electronic conductivity on the surface of the negative electrode by reacting to electrolyte. This can cause the resistance of a battery to rapidly increase, such that particles are isolated from an electronic conductivity network, which inhibits the battery from being charged and discharged.

Due to the above disadvantages of the battery using the lithium metal, a graphite material capable of absorbing and exhausting lithium ions instead of the lithium metal has been used as the negative electrode active material. When graphite is used as the negative electrode active material, metal lithium is not precipitated, which does not causes the above problem with the dendrite. However, the theoretical discharge capacity of the lithium metal comes to 3860 mAh/g when the lithium metal is employed as the negative electrode, but the theoretical discharge capacity of the graphite comes to only 372 mAh/g when the graphite is employed as the negative electrode. Hence, a new active material having a higher capacity than the graphite active material is needed.

In order to increase a discharge capacity of a battery, metal materials such as Tin (Sn), Aluminum (Al) or Zinc (Zn), and the like are formed into a lithium compound and non-metal materials such as Si, Germanium (Ge), Boron (B), Phosphorus (P), and the like, or oxide thereof have been suggested as negative electrode active materials. Although active materials of the metal, non-metal materials, or oxide thereof have a theoretically higher capacity than graphite, they have a high capacity at an initial stage, but since these active materials have a low electrochemical reversibility, they are often disadvantageous in that capacity falls quickly during a charge/discharge cycle. This disadvantage causes a reduction in the lifetime of a battery. To address this problem, it has been suggested to use an active material (hereinafter referred to as metal-carbon combination active material) in combination of the material forming the lithium compound and a carbonaceous material.

The metal-carbon combination active material can be manufactured by burying the metal and non-metal materials, or the oxide particles thereof, in a carbonaceous material or by coating the metal and non-metal materials with carbon and then burying them in the carbonaceous material, and by mixing the metal and non-metal materials with the carbonaceous material at a high temperature.

A negative electrode of a lithium ion battery comprises an active material that joins the battery reaction, a current collector, a high-polymer binder that combines the active material and the current collector and adheres the active material to the current collector. The active material used for the negative electrode of the lithium ion battery is in the form of particles and is adhered to the current collector by the high-polymer binder. Particles of the active material adhered by the high-polymer binder are electrically connected to each other and are coupled to the current collector by point contact. Therefore, if particles of the active material have a low degree of the point contact, i.e., if particles of the active material have a small point contact area, a battery internal resistance has a large value, and a particle of the active material that is isolated due to the small point contact does not contribute to a battery capacity. Hence, it is important to maintain a large contact area between particles of the active material.

A battery reaction between positive and negative electrodes of a battery occurs when the battery is charged and discharged. If the battery reaction occurs, the lithium ion is inserted into or exhausted from an active material particle structure of the negative electrode, resulting in an expansion or shrinkage of particles of the active material. Although it depends on a type of a material used as the active material, natural graphite has a bulk variation of 10% at the maximum, and the metal-carbon combination active material has a bulk variation greater than or equal to 10%. Therefore, an electrical connection between particles of the active material by point contact may be unstable during charging and discharging.

Due to the bulk variation and instability between particles of the active material during charging and discharging, internal resistance of the lithium ion battery, can gradually increase and a battery capacity can gradually decrease whenever the lithium ion battery is charged and discharged, resulting in a reduction of the lifetime of the lithium ion battery. Although a lifetime degradation caused by the bulk variation of the active material can be reduced by adding a material such as carbon black as a conductive material to the lithium ion battery, an excessive use of this conductive material can cause a reduction in a component ratio of the active material, which reduces a discharge capacity of the lithium ion battery.

SUMMARY OF THE INVENTION

The present invention provides a negative electrode for a lithium rechargeable battery having a large charging/discharging capacity, high charging/discharging efficiency, a flat discharge curve, and a good lifetime charging/discharging cycle characteristic, and a lithium rechargeable battery adopting the negative electrode, to address the above problems with a conventional lithium rechargeable battery.

According to an aspect of the present invention, there is provided a negative electrode for a lithium rechargeable battery comprising: active material layers including metal-carbon combination active material particles including at least one active material selected from metal or metal oxide and carbonaceous active material, soft graphite particles, and a binder for binding the metal-carbon combination active material particles and the soft graphite particles; and a current collector on which surface the active material layers are stacked, wherein the soft graphite particles have a pellet density of 1.6~1.9 g/cc when a pellet is formed at a press pressure of 1 ton per cubic centimeter.

The pellet density was measured by manufacturing a pellet having a diameter of 1 mm via a hydraulic press. The weight of the pellet is fixed to 1±0.1 g.

The metal-carbon combination active material is a combination of one or more materials selected from Sn, Al, Si, SnO, $SnO_2$, and $SiO_2$ and a carbonaceous material, and has a sole discharge capacity between 450 and 1000 mAh per gram.

A combination type of the metal-carbon combination active material comprises a type of separating metal in carbon or a type of coating metal with carbon, and the present invention does not limit the type thereof.

A carbonaceous material forming the metal-carbon combination active material may use any one of amorphous carbon and crystalline carbon. However, the crystalline carbon such as natural graphite or artificial graphite may be preferable to an extension of a lithium ion.

Soft graphite that is added to manufacturing of the negative electrode of the present invention, which serves as an active material and a kind of conductive auxiliary material as well, has flexible physical property and easily transforms due to a layer displacement by a pressure, whereas the soft graphite has a small bulk variation by charging and discharging of a battery.

Slurry is suitable for forming a general active material layer that the soft graphite has d002 interlayer distance of 0.335±0.01 nm by an X-ray diffraction, and has an average particle diameter between 5 and 40 μm.

The soft graphite is an artificial graphite or natural graphite.

Particles of the soft graphite may mix with the metal-carbon combination active material particles at an equal weight and bulk ratio so that the soft graphite can be suitable as a conductive material in the active material and a bulk variation absorbing material when the battery is charged and discharged. Hence, the soft graphite particles can occupy 30 to 70 wt % of the whole active material layers.

In order to describe an operating type of the soft graphite particles according to the present invention, a polar plate of the negative electrode is formed by mixing various active material particles, a binder, and a dispersion medium, forming a slurry for an active material layer, coating the slurry on a current collector, removing the dispersion medium from the slurry, and performing a rolling process with regard to the polar plate.

With regard to the rolling process, the negative electrode active material layers are stacked on a metal foil in the form of slurry, are pressed at a roll press leading end pressure of 0.7 ton/cm at a rolling process, and have a density range of 1.5 and 1.9 g/cc. In this regard, a density of the active material layer by a predetermined pressure of a leading end is closely related to property of the soft graphite under the control of another parameter.

BRIEF DESCRIPTION OF THE DRAWINGS

The above and other features and advantages of the present invention will become more apparent by describing in a detail exemplary embodiment thereof with reference to the attached drawing in which:

FIG. 1 is a schematically cross-sectional view of a combination between soft graphite particles and metal-carbon combination active material particles in a negative electrode active material layer according to an embodiment of the present invention.

DETAILED DESCRIPTION OF THE INVENTION

Referring to FIG. 1, soft graphite particles 20 are combined with metal-carbon combination active material particles 10 in a negative electrode active material layer by a binder 30 and the resulting combination is transformed by pressure occurring during rolling processing during a process of forming a negative electrode. That is, an interlayer slide easily occurs.

Therefore, the soft graphite particles 20 serve as mediums between the metal-carbon combination active material p articles 10, and have a large conductive contact surface 40 with the metal-carbon combination active material particles 10, and provide a large electron path, and make it possible to manufacture a lithium rechargeable battery having a low internal resistance.

Further, the soft graphite particles 20 that serve as mediums between the metal-carbon combination active material particles 10 reduce a bulk variation of the metal-carbon combination active material particles 10 due to the charging and discharging of a battery. Thus, the electron path generated at an initial rolling process can be maintained, thereby preventing degradation of the lifetime of the battery.

The present invention does not limit a type of a binder or an adhesive used for a combination of particles of a negative electrode active material layer, and may generally use a high-polymer material including PVDF (polyvinylidene fluoride), PVC (polyvinyl chloride), PMMA (polymethyl methacrylate), SBR (styrene-butadiene rubber), SBR latex, and PTFE (polytetrafluoroethylene) as the binder or the adhesive.

The present invention may user NMP (N-methyl-2-pyrrolidone) or acetone as a volatile organic solvent and does not limit a type of the volatile organic solvent.

The present invention may use various types of a metal plate, a metal film, a metal net, a perforated metal thin film, a carbon plate, a carbon coated metal, and the like as a current collector of the negative electrode plate, which is not limited by a geometrical structure and a chemical composition of the current collector.

The present invention will now be described more fully with reference to the accompanying drawings, in which exemplary embodiments of the invention are shown.

First Embodiment

Lithium cobalt oxide LiCoO2, PVDF (polyvinylidene fluoride), and carbon black are mixed at a weight ratio of 92:4:4 as a positive active material, a binder, and a conductive material, respectively, the mixture is dispersed in NMP (N-methyl-2-pyrrolidone), and a slurry of the positive electrode active material is manufactured. The slurry of the positive electrode active material is coated on an upper portion of an aluminum foil that is a current collector having a thickness of 20 μm by using a coating device, the coated aluminum foil is dried, the dried aluminum foil is pressed via a roll press, and a positive electrode is manufactured.

A Si-graphite compound of 55 wt % as metal-carbon compound active material particles, PVDF of 5 wt % as a binder, and soft graphite of 40 wt % having a pellet density of 1.7 g/cc measured at a pressure of 1 ton/cm² are mixed, the mixture is solved and dispersed in NMP, and negative electrode mixture slurry is manufactured. The negative electrode mixture slurry is coated on a copper foil having a thickness of 10 μm, the coated copper foil is dried, the dried copper foil is pressed via the roll press, and a negative electrode is manufactured.

LiPF6 is solved in a solvent that is a mixture of ethylene-carbonate and dimethyl-carbonate at a volume ratio of 3:7 and electrolyte having a concentration of 1.15 M is prepared.

A polyolefin separator is disposed between the positive and negative electrodes, the separator is wound, an electrode assembly is formed, the electrode assembly is mounted in a case, the electrolyte is injected in the case, an electrolyte injection outlet is sealed, and a 18650 size cylindrical type lithium ion battery is completed.

The lithium ion battery is charged at a charge current of 1 C and a charging termination voltage of 4.2 V, is discharged at a discharge current of 1 C, and a discharge termination voltage of 2.7 V, and a charging/discharging cycle test of the lithium ion battery is carried out.

A discharge capacity retention of a $100^{th}$ cycle with regard to a first cycle is indicated in Table 1.

The combination active material uses Si of 10 wt %, Pitch carbon of 10 wt %, and core graphite of 80 wt % as a Si-graphite combination. A pellet density measured by discharging a battery at a low rate of 0.2 C, releasing the battery, and washing an electrode plate in DEC (diethylene carbonate) has a value of 1.62 g/cc.

TABLE 1

|  | capacity retention @ $100^{th}$ cycle |
|---|---|
| Embodiment 1 | 82% |
| Embodiment 2 | 70% |
| Embodiment 3 | 74% |
| Embodiment 4 | 70% |
| Comparative Example 1 | 55% |
| Comparative Example 2 | 45% |

Second Embodiment

This embodiment is the same as the first embodiment except for a metal-carbon combination active material of 60 wt %, PVDF of 10 wt % as a binder, and soft graphite of 30 wt %. In this regard, a pellet density is 1.6 g/cc.

Third Embodiment

This embodiment is the same as the first embodiment except that soft graphite having 1.9 g/cc at 1 ton per cubic centimeter is used to manufacture a negative electrode polar plate.

Fourth Embodiment

This embodiment is the same as the first embodiment except that soft graphite having 1.6 g/cc at 1 ton/cm2 is used to manufacture a negative electrode polar plate.

First Comparative Example

This comparative example is the same as the first embodiment except that a metal-carbon combination active material of 85 wt %, PVDF of 5 wt % as a binder, and graphite of 10 wt % having an average particle diameter of 3 urn as a conductive material are mixed, the mixture is solved and dispersed in NMP, and a negative electrode combination slurry is manufactured.

Second Comparative Example

This comparative example is the same as the first embodiment except that when a negative electrode is manufactured, graphite that is not easily transformed when a pressure is applied is used, instead of soft graphite, to manufacture a cell. The graphite has a pellet density of 1.5 g/cc at a pressure of 1 ton/cm2.

The present invention uses a metal-carbon combination active material that is helpful to attain a charging and discharging capacity in a negative electrode active material layer, and adds soft graphite having an amount equal to that of the metal-carbon combination active material, so that soft graphite particles can serve as auxiliary conductive materials between metal-carbon combination active material particles when all active material particles are equally dispersed on an active material layer, making it possible to attain an output and charging and discharging capacity of a lithium rechargeable battery more than a predetermined level of amount.

Further, the present invention uses soft graphite as a shock absorbing material when the bulk of the metal-carbon combination active material particles expands by the charging of the battery, which inhibits the expansion of bulk in the active material layer as a whole. This also maintains a conductive contact point between the active material particles including the soft graphite particles, thereby reducing degradation of the battery's capacity due to a repetition of the charging and discharging of the battery and thereby increasing the lifetime cycle of the battery.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the present invention is defined not by the detailed description of the invention but by the appended claims, and all differences within the scope of the present invention will be construed as being included in the present invention.

What is claimed is:

1. A negative electrode for a rechargeable battery comprising:
    active material layers including:
    metal-carbon combination active material particles including:
        at least one active material selected from metals, and metal oxides; and
        a carbonaceous active material,
    soft graphite particles contacting the metal-carbon combination active material particles, and
    a binder binding the metal-carbon combination active material particles to the soft graphite particles, all of which is disposed between two separate direct points of contact between the metal-carbon combination active material particles and the soft graphite particles which they directly contact; and a current collector on which surface the active material layers are stacked, wherein the soft graphite particles have a pellet density of 1.6~1.9 g/cc when a pellet is formed at a press pressure of 1 ton/cm$^2$;

wherein the soft graphite particles occupy 30 to 70 wt % of the whole active material layers; and wherein the soft graphite particles have portions transformed by the binder, the transformed portions being directly in contact with a portion of the metal-carbon combination active material particle.

2. The negative electrode of claim 1, wherein the soft graphite has a d002 interlayer distance of 0.335±0.01 nm as measured by X-ray diffraction, and has an average particle diameter between 5 and 40 μm.

3. The negative electrode of claim 1, wherein the metal-carbon combination active material is a combination of:
one or more materials selected from Sn, Al, Si, SnO, SnO$_2$, and SiO$_2$; and
a carbonaceous material.

4. The negative electrode of claim 3, wherein the metal-carbon combination active material has a discharge capacity between 450 and 1000 mAh per gram.

5. The negative electrode of claim 1, wherein the soft graphite is an artificial graphite or natural graphite.

6. A rechargeable battery comprising:
a negative electrode,
a separator,
a positive electrode,
an electrode assembly having both electrodes stacked, and
a case storing the electrode assembly,
wherein the electrode assembly includes the negative electrode comprised of active material layers including:
metal-carbon combination active material particles including:
at least one active material selected from metal or metal oxide and carbonaceous active material,
soft graphite particles contacting the metal-carbon combination active material particles, and
a binder binding the metal-carbon combination active material particles to the soft graphite particles, all of which is disposed between two separate direct points of contact between the metal-carbon combination active material particles and the soft graphite particles which they directly contact; and
a current collector on which surface the active material layers are stacked,
wherein the soft graphite particles have a pellet density of 1.6~1.9 g/cc when a pellet is formed at a press pressure of 1 ton/cm$^2$;
wherein the soft graphite particles occupy 30 to 70 wt % of the whole active material layers; and
wherein the soft graphite particles have portions transformed by the binder, the transformed portions being directly in contact with a portion of the metal-carbon combination active material particle.

7. The battery of claim 6, wherein the negative electrode is stacked on a metal foil in the form of slurry, the slurry is pressed at a roll press leading end pressure of 0.7 ton/cm, and an active material is formed within a density range of 1.5 and 1.9 g/cc.

8. The battery of claim 6, wherein the soft graphite has a d002 interlayer distance of 0.335±0.01 nm as measured by X-ray diffraction, and has an average particle diameter between 5 and 40 μm.

9. The battery of claim 6, wherein the metal-carbon combination active material is a combination of:
one or more materials selected from Sn, Al, Si, SnO, SnO$_2$, and SiO$_2$; and
a carbonaceous material.

10. The battery of claim 9, wherein the metal-carbon combination active material has a sole discharge capacity between 450 and 1000 mAh per gram.

11. The battery of claim 6, wherein the soft graphite is an artificial graphite or natural graphite.

* * * * *